Figure 1:
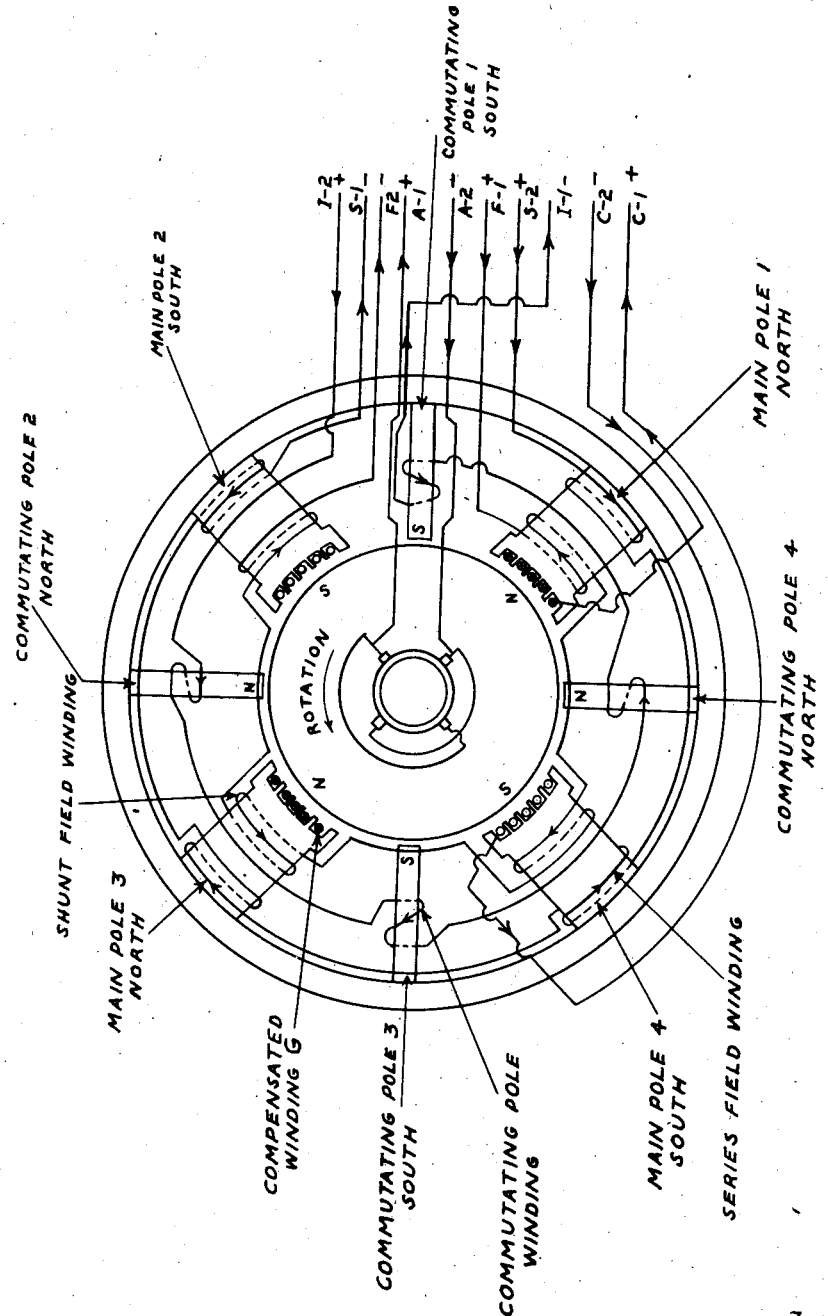

Oct. 14, 1947.

E. A. SALAY 2,429,075

COMPENSATED ARC WELDER

Filed Jan. 6, 1944

3 Sheets-Sheet 3

Inventor:
Eugene A. Salay,
by: Attorney.

Patented Oct. 14, 1947

2,429,075

UNITED STATES PATENT OFFICE 2,429,075

COMPENSATED ARC WELDER

Eugene A. Salay, St. Paul, Minn.

Application January 6, 1944, Serial No. 517,282

6 Claims. (Cl. 315—305)

This invention relates to a compensated arc welder. The feature resides in providing a compensated winding in the generator which is short-circuited. This short-circuited compensated winding is an important feature in my welding generator. Thus, the total full load current of the armature in the small generator does not have to pass through the compensated winding in order to stop field distortion due to the armature reaction.

In my generator, the compensated winding is embedded in the four main poles. Thus, any variation from the magnetic field will cause the voltage to be generated in the compensated winding and being short-circuited, will set up a field of its own, opposed to that of the armature, this will prevent field distortion due to armature reaction.

A further feature of my compensated arc welder resides in the fact that there is a time delay in the magnetic field of the compensated winding. Thus, as the field varies in the generator, the voltage induced in the compensated winding lags behind the field that causes it.

In operation, the voltage across the arc is continually changing and the strength of the magnetic field is continually changing. This is due to the fact that the generator is differential compound wound and its series field opposes the shunt field. As the generator is in operation, the full load current of the armature passes through four series field coils, which gives uniform variation in all four magnetic circuits. Then, as the welding rod is melting away and is deposited on the weld, voltage across the arc is continually changing, causing a variation in the field circuits of the generator. As this change occurs in the magnetic circuits in my generator, it induces a voltage in the compensated winding behind the field that causes the change, which in turn causes a rebound of the magnetic field of the compensated winding cushioning the magnetic field of the generator. This automatically helps maintain a smooth welding arc.

It is also a feature to provide leads coming from the stabilizer to the current control wheel. The stabilizer is provided with another auxiliary winding with leads coming from the same to the short circuiting switch. This winding in the stabilizer is connected with the compensated winding in the generator. The winding in the stabilizer may be termed an auxiliary winding in the stabilizer. The purpose of this winding is to utilize the power in the compensated winding in the generator, which otherwise would be overcompensated.

Thus, the amount of short-circuit will be regulated by this short-circuit switch which is connected to the current control wheel. The behavior of the arc will be much improved by this additional auxiliary winding on the stabilizer. The operator will be able to regulate the current being used for a weld and the proper amount of the short-circuited compensated winding may be determined as I have done in a generator of this type which I have built.

It is a feature to provide a welding generator wherein field distortion is controlled to overcome a wild arc in welding and thus reduce to a minimum splatter. In my compensated arc welder, I overcome wildness of arc which automatically causes burning a hole through the metal under the arc. With my compensated arc welder considerable time is saved which would would ordinarily be lost by the operator having to adjust his welding apparatus at frequent intervals. If the welding apparatus is some distance from the operator, considerable time may be lost.

It is a feature of my invention to take advantage and put to work changes which take place in the voltage owing to the change in distance between work and the rod and the length of the welding rods as the arc eats away the rod and deposits it on the weld. The rise and fall of voltage is put to work with the addition of the compensated winding which is embedded in the pole faces. As the voltage rises and falls, magnetic strength of the field is increased and decreased, owing to the fact that the series field is connected in the series with the armature and wound on the four field poles. Therefore, as the field is being varied, owing to the voltage rising and falling, magnetism in the field poles rise and fall in strength and with the compensated winding embedded in the field poles, this magnetism threads the compensated winding and induces a voltage in it which also has a magnetic field of its own. This induced voltage is pulsating current always in the same direction but continually changing in strength.

Figure 2:
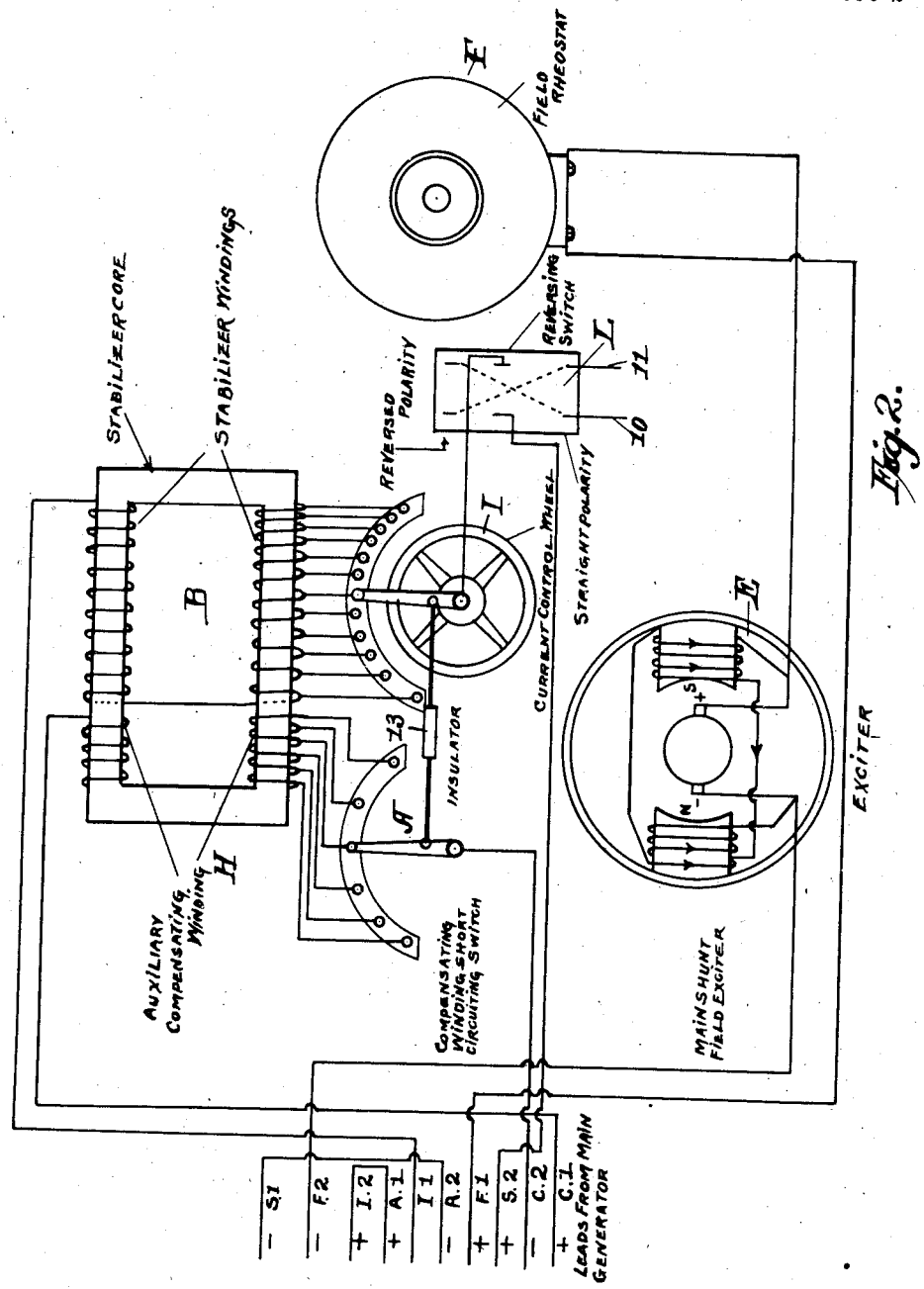
Figure 3:
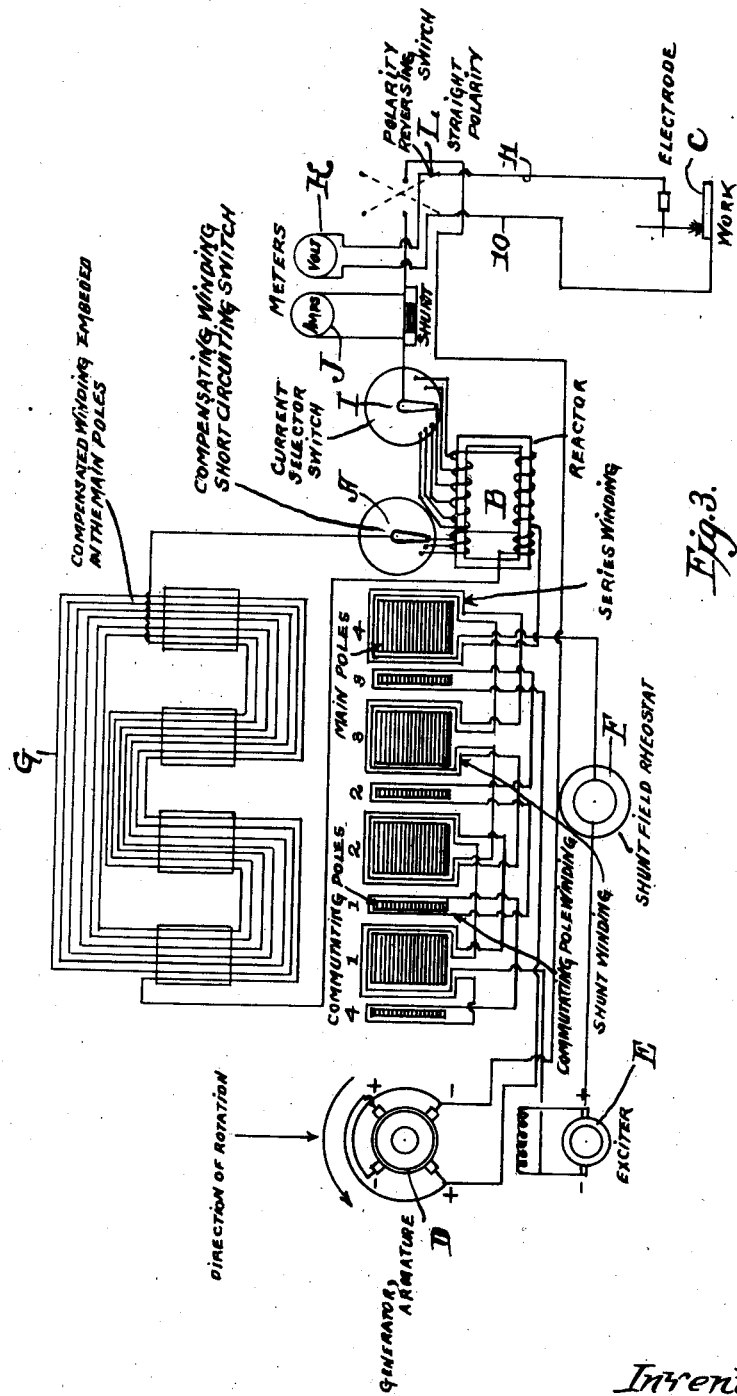

These features, together with other details and objects, will be more fully hereinafter defined. In the drawing forming part of the specifications, Figure 1 is a diagrammatic illustration of the winding diagram of my generator. Figure 2 is a diagrammatic illustration of my generator control. Figure 3 is a diagrammatic wiring diagram for my compensated arc welder showing the manner in which the generator is connected with the various associated parts, including the generator armature, the current selector switch, compensating winding short-circuited switch, the electrode and the work on which the weld is taking place.

I believe that if field distortion is controlled, many of the present difficulties with arc welding will be eliminated and that splatter will be reduced. Field distortion causes many of the magnetic disturbances with disadvantages in the welding generator as follows:

Arc recovery with field distortion is possible only with the wild arc and splatter of rod, until operator adjusts arc welding generator.

Arc stability is uncertain. Arc recovery is possible only under certain disadvantages.

Wildness of arc causes burning and often causes a burning of a hole through the metal under the arc.

Field distortion may require operator to set his welding current frequently, or at intervals, through the working day which means part of the operator's time is lost through setting of his arc welding equipment. If welding machine is located a great distance from operator, considerable time is lost.

Further, increase in welding range is limited with field distortion present. Quick response to changes in magnetic field is retarded by field distortion.

In these old types of welders, the arc wanders over a considerable range as magnetic uncertainty is caused by field distortion. In these former types of arc welders, as the arc penetrates into the metal as it should in all well designed generators, a wild arc may blow a molten metal from weld.

These various disadvantages above related are overcome by my compensated arc welder.

Referring to the drawing, Figure 1 shows the winding diagram of the generator with ten leads coming out of the same. These leads I have designated as C—1, the compensated winding outgoing of the positive lead; C—2, the compensated winding in-going of the negative lead; S—2, series field winding of the in-going positive lead; F—1 the shunt field winding of the positive in-going lead; A—2, the armature winding of the in-going negative lead; I—1, the inner poles or commutating poles of the negative outgoing lead; A—1, the armature winding of the positive out-going lead; I—2, the inner poles or commutating poles of the positive in-going lead; F—2 indicates the shunt field negative out-going lead; and S—1 indicates the series field negative out-going lead.

The generator is equipped with four main poles and four commutating poles which are indicated as main pole 1, commutating pole 1, main pole 2, commutating pole 2, main pole 3, commutating pole 3, main pole 4, commutating pole 4. My invention may also be used in a generator with any even number of poles.

The heavy lines in the drawing in Figure 1 around the four main poles are the series field winding. The heavy lines around the four heavy commutating poles are the commutating pole winding. The light lines around the four main poles are the shunt field windings, while the winding that goes through the four pole faces is the compensated winding. I have also indicated the windings correspondingly marked in Figure 2.

In operation, as the operator is welding, the distance between the work and the rod lengthens as the arc eats away the rod and is deposited on the work forming the weld. As the welding process goes on, the voltage of the arc welding generator rises and falls according to the distance of the rod from the work. This is termed a pulsating current because it is always in the same direction, but continually varies in strength. This rise and fall in voltage is the force which I put to work in my generator.

Compensated winding is not new in generators. It is being used in large generators and Diesel electric locomotives, and, in fact, in all generators where service is very severe, compensated winding is used to an advantage. In large generators, compensated winding is usually connected in series with the armature, while in my generator, the compensated winding has no electrical connection with the armature.

In my compensated arc welder, as stated, I put to work the rise and fall in voltage and, in addition, utilize compensated winding which is embedded in the pole faces, as illustrated in Figure 1. In operation, as the voltage rises and falls, magnetic strength of the field increases and decreases because the series field is connected in series with the armature and wound upon the four field poles. The shunt winding provides the necessary excitation for the four main field poles. This shunt winding receives power from a separate small generator E, which is called an exciter.

The shunt winding has the necessary ampere turns on each main pole to produce a given amount of magnetic flux in all four magnetic circuits. The series field winding is wound on and over the four shunt field coils. The number of turns in the series field coils is fixed in my generator and is never changed.

The series field is connected in series with the generator armature and is connected in such a way as to oppose the shunt field magnetism. With four shunt field coils and four series field coils it is apparent that the four magnetic circuits in my generator are varied in a uniform manner. This will help to some degree to maintain a steady voltage across the arc.

In all four main poles there are a number of slots in each pole face to be used by the compensated winding to prevent field distortion. I mentioned above, about winding the series field coils over the shunt field coils because, there is a transformer action between the series and shunt fields, when the operator strikes an arc with my generator the series field opposes the shunt field, and as the welding process goes on the voltage across the arc is continually changing. As the series fields are bucking the shunt field the current in the series field is also varying as to strength and in turn demagnetizes the four main poles by so many ampere turns depending of course on the number of turns in the series field coil and the total amount of current following through the coil. As the series field varies only instantaneous values can be used. When the field strength in my generator is varied which it does when actually welding, the four magnetic circuits are varied accordingly, and all four magnetic circuits are varied uniformly. This varying field induces a voltage by electromagnetic induction in the compensated winding which also produces a field opposite to that of the armature and prevents armature reaction which in turn would cause field distortion if it were not for the compensated winding. This winding is connected with the auxiliary winding on the stabilizer, necessary connections are made with the compensated winding short circuiting switch. This switch is also used as a connection switch for connecting the compensated winding in the generator and the auxiliary winding on the stabilizer together. Referring to Figure 2, the ten leads from the generator are marked with the corresponding leads shown on Figure 1 which extend from the main generator. It will be apparent by tracing lead wire C—1 that it connects to the compensated winding on the stabilizer and lead C—2 connects wtih the compensated wiring short-circuited switch A illustrated in Figure 2.

Thus, as the field is being varied because of the change in voltage (namely, rising and falling), the magnetism in the field poles rises and falls in strength with the compensated winding embedded in the field poles, this magnetism threads the compensated winding and induces a voltage in it, and sets up a magnetic field which opposes that of the armature field. This induced voltage is pulsating current always in the same direction but continually changing in strength. I illustrated in Figure 2, the six leads coming from the auxiliary winding B of the stabilizer.

The wiring diagram illustrated in Figure 3 is diagrammatic to illustrate the general layout of the wiring in relation to the welding work C. This wiring diagrammatically illustrates the armature D showing the direction of rotation and a diagrammatic layout of the fields showing the main poles and the commutating poles with the connecting wiring.

I have also illustrated the exciter E, together with the shunt field rheostat F. In this diagrammatic illustration shown in Figure 3, the compensating winding G is illustrated connected to the compensating winding short-circuit switch A. The compensated winding G is illustrated diagrammatically in Figure 1 and is illustrated laid out in a diagrammatic manner in Figure 3. This compensated winding is embedded in the pole faces as diagrammatically illustrated in Figure 1. The auxiliary winding H is formed as a part of stabilizer B as illustrated in Figures 2 and 3. This auxiliary winding H is controlled by the compensating winding short-circuit switch A, whereas the stabilizer winding is controlled by the switch I illustrated in Figures 2 and 3.

I provide an ammeter and volt meter J and K respectively illustrated in Figure 3. It is also desirable to provide in the circuit a reversing switch L for reversing the polarity when desired.

The leads 10 and 11 shown extending from the reversing switch L extend to the electrode and the work in the welding operation as illustrated in Figure 3. The switches A and I may be connected in any suitable manner by means of the connecting rod 12 which connects to the respective arms of the switches A and I and is linked by the insulator 13. Thus the switches A and I may be operated in unison if desired or may be operated separately.

It will therefore be apparent that I provide the compensated winding embedded in the main poles which is short-circuited through the auxiliary winding H of the stabilizer B. In this manner I provide a means in my compensated arc welder for cushioning or compensating the current flowing through the same in and through the electrode and work so as to overcome field distortion and providing a more uniform flow of current in the welding operation, thus overcoming the difficulties that have been apparent heretofore in the ordinary welding generator. In this manner I provide a welding generator wherein field distortion is controlled eliminating a wild arc in welding and reducing to a minimum splatter, as well as the possibility of burning a hole through the metal under the arc. In practice I have found that my compensated arc welder is more easily operated and that considerable time is saved by the operator which would ordinarily be consumed in adjusting the welding apparatus at frequent intervals.

I claim:

1. A compensated arc welding generator in combination with a stabilizer, including pairs of series field windings, pairs of commutating poles, a generator armature, a compensated winding extending through the face portions of the field poles, an auxiliary winding in said stabilizer, a main winding in said stabilizer connected in series in the welding circuit, a short-circuiting switch for said auxiliary winding for varying the turns thereof, a current control switch for said main stabilizer winding, and means for connecting said switches to operate the same in unison whereby the current from said welding generator may be compensated to provide a smooth welding arc to minimize splatter during the welding operation.

2. A compensated generator arc welder, including a generator having a field frame, a plurality of field poles and an armature, shunt windings embracing said field poles, series field windings wound over the shunt windings, a compensating winding associated with the face portions of said pole pieces, a stabilizing reactor in an output circuit from the generator, and means including an auxiliary winding inductively associated with the reactor winding for variably short circuiting the compensating winding through the auxiliary winding.

3. A compensated generator arc welder, including a generator having pairs of field windings and field poles, an armature in series with the field windings, a compensating winding embedded in the faces of said field poles, a stabilizing reactor including a core and a winding thereon in a welding circuit from the generator, an auxiliary winding associated with the reactor winding and on the same core, and variable switching means for connecting portions of said auxiliary winding and said compensating winding in closed circuit, whereby during an arc welding operation said windings coact to reduce field distortion.

4. A compensated arc welder, including a generator, having a field frame and a plurality of field poles thereon, shunt windings on said field poles, pairs of field windings wound over the shunt windings, a compensated winding embedded in the face of said field poles, a stabilizer core and variable winding thereon in a welding circuit from the generator, a variable auxiliary winding associated with the stabilizer winding on the same core, a variable switching means for short circuiting the compensated winding through said auxiliary winding, a variable switch for said stabilizer winding, and means for connecting said variable switches for operating the same in unison to control field distortion in the generator during welding operations.

5. A compensated arc welder, including a generator having an armature and a plurality of field poles, shunt windings on said field poles, field windings in series with the armature and wound over said shunt windings, a stabilizing reactor comprising a core and winding in an output welding circuit from the generator, a compensating winding embedded in the face portions of the field poles, an auxiliary winding in closed circuit with said compensating winding and inductively associated with said reactor windings, and means for varying in unison the number of turns value of the reactor and auxiliary windings.

6. In a compensated arc welder, a generator having a plurality of pole pieces and an armature, shunt windings on said pole pieces, an exciter for said windings, field windings wound over said shunt windings in inductive relation thereto and in series with said armature, a compensating winding in the face portions of said pole pieces, a reactor stabilizer comprising a core and tapped winding thereon in a welding circuit from the generator, a tap switch for varying the turns of said stabilizer winding, a tapped auxiliary winding associated with the stabilizer winding on the stablizer core, a tap switch for varying the number of turns of said auxiliary winding, said auxiliary winding and compensating windings being connected in a closed circuit, and connecting means whereby said tap switches may be moved in unison.

EUGENE A. SALAY.

REFERENCES CITED

The following references are of record in the file of this patent:

UNITED STATES PATENTS

| Number | Name | Date |
|---|---|---|
| 1,002,383 | Fynn | Sept. 5, 1911 |
| 1,313,050 | Ball | Aug. 12, 1919 |
| 1,387,487 | Hansen | Aug. 16, 1921 |
| Re. 19,446 | Creedy | Feb. 5, 1935 |
| 1,962,692 | Landis | June 12, 1934 |